(12) United States Patent
Catlow

(10) Patent No.: US 7,547,048 B2
(45) Date of Patent: Jun. 16, 2009

(54) FLUID QUICK CONNECTOR WITH INTEGRAL PIVOTAL RETAINER

(75) Inventor: Eric Catlow, Oakland Township, MI (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 395 days.

(21) Appl. No.: 11/298,134

(22) Filed: Dec. 9, 2005

(65) Prior Publication Data

US 2007/0132235 A1    Jun. 14, 2007

(51) Int. Cl.
*F16L 37/00* (2006.01)
(52) U.S. Cl. ...................................... 285/305; 285/320
(58) Field of Classification Search .................. 285/305, 285/308, 320, 319
See application file for complete search history.

(56) References Cited

U.S. PATENT DOCUMENTS

| | | | | |
|---|---|---|---|---|
| 3,250,551 A * | 5/1966 | Draudt | ........................ | 285/319 |
| 4,542,922 A * | 9/1985 | Grossauer | .................... | 285/320 |
| 4,919,462 A * | 4/1990 | Matsui et al. | ................ | 285/305 |
| 5,782,502 A * | 7/1998 | Lewis | .......................... | 285/305 |
| 6,254,145 B1 * | 7/2001 | Schwarz et al. | .............. | 285/319 |
| 6,523,864 B1 * | 2/2003 | Discher et al. | .............. | 285/319 |
| 6,637,779 B2 * | 10/2003 | Andre | ......................... | 285/305 |
| 6,755,675 B2 | 6/2004 | Szabo et al. | ................. | 439/191 |
| 7,029,036 B2 * | 4/2006 | Andre | ......................... | 285/319 |
| 7,270,350 B2 * | 9/2007 | Cronley | ...................... | 285/305 |

* cited by examiner

*Primary Examiner*—David E Bochna
(74) *Attorney, Agent, or Firm*—Carlson, Gaskey & Olds PC

(57) ABSTRACT

A fluid quick connector includes an integral retainer pivotally mounted on a housing for latchingly coupling a first endform in the bore of the housing. The retainer is coupled to the housing by a living hinge forming the retainer and the housing as a one-piece unitary body to eliminate the need to manufacture and assemble a separate retainer in the connector.

5 Claims, 5 Drawing Sheets

FLUID QUICK CONNECTOR WITH INTEGRAL PIVOTAL RETAINER

BACKGROUND

The present invention relates, in general, to fluid quick connectors which couple fluid carrying components.

Snap-fit or quick connectors are employed in a wide range of applications, particularly, for joining fluid carrying conduits in automotive and industrial application. In a typical quick connector with an axially displaceable retainer, the retainer is fixedly mounted within a bore in a housing of a connector component or element. The retainer has a plurality of radially and angularly extending legs which extend inwardly toward the axial center line of the bore in the housing. A tube or fitting to be sealingly mounted in the bore in the housing includes a radially upset portion or flange which abuts an inner peripheral surface of the retainer legs. Seal and spacer members as well as a bearing or top hat are typically mounted in the bore ahead of the retainer to form a seal between the housing and the fitting when the fitting is lockingly engaged with the retainer legs.

Radially displaceable retainers in which the retainer is radially displaceable through aligned bores or apertures formed transversely to the main through bore in the housing are also known. The radially displaceable retainer is typically provided with a pair of depending legs which are sized and positioned to slip behind the radially upset portion or flange on the fitting only when the fitting or conduit is fully seated in the bore in the connector. This ensures a positive locking engagement of the conduit with the connector as well as providing an indication that the conduit is fully seated since the radially displaceable retainer can be fully inserted into the connector only when the conduit has been fully inserted into the bore in the connector.

In most fluid quick connectors, one or more seal elements, such as resilient O-rings and and/or a rigid spacer member between two spaced O-rings, are mounted in the housing bore to form a seal between the housing and the inserted endform.

A top hat is also typically mounted in the end of the bore to retain the seal elements in the bore prior to insertion of the endform into the bore in the housing or after removal of the endform from the housing. The top hat typically includes a sleeve portion which slides within the bore of the housing, and an end flange which seats in an enlarged end portion of the bore.

In addition to retainers for fluid quick connectors which engage an upset in the form of an enlarged diameter bead or flange spaced from the tip end of an endform, it is also known to construct retainers for fluid quick connectors which secure the endform in the quick connector housing by interlocking a movable retainer with a groove or recess in the endform.

The one or more seal elements as well as the top hat represent separate components which are separately manufactured and must be individually installed into the bore in the fluid quick connector housing. The transverse or axially operable retainers are also separate components which must be individually mounted in the quick connector housing.

Thus, it would be desirable to provide a fluid connector which has a low manufacturing cost due the use of a minimal number of separate components resulting in reduced manufacturing and assembly time, and associated labor.

SUMMARY

The present invention is a fluid quick connector with an integral pivotal retainer. The fluid quick connector receives an endform having an engagement surface. The quick connector includes a housing having a bore extending from a first end adapted to receive the endform, and a retainer carrying an endform engagement member adapted to engage the engagement surface on the endform to latch the endform in the housing. The retainer is pivotally connected to the housing for movement between a first position allowing movement of the endform relative to the housing and a second position engaged with the housing to latch the endform I the housing.

In another aspect, a fluid coupling includes an endform having a tip end and an engagement surface spaced from the tip end, a housing having a bore extending from a first end adapted to receive the endform, and a retainer carrying an endform engagement member adapted to engage the engagement surface on the endform to latch the endform in the housing. The retainer is pivotally connected to the housing for movement between a first position allowing movement of the endform relative to the housing and a second position engaged with the housing latching the endform in the housing.

The fluid quick connector with integral pivotal retainer maintains the function of a retainer in fluid quick connectors to releasably latch an endform on a fluid carrying component in the connector body while at the same time reducing the number of separate parts and, thereby reducing the assembly time required to assemble all of the components of the quick connector by forming the retainer as an integral one-piece part of the connector body. The connector body carries the retainer at all times whereby simplifying manufacture, shipping to the end user, and installation since the retainer cannot be disengaged or inadvertently separated from the connector body. The fluid quick connector also makes use of a unique pivotal action for the retainer which enables the retainer to be easily moved from a first open position allowing movement of the endform relative to the connector body, i.e., into or out of the connector body, and a second latched position in which the retainer is locked on the connector body latching the endform in the connector body. At the same time, the retainer may be unlocked from the connector body allowing separation of the endform from the connector.

BRIEF DESCRIPTION OF THE DRAWING

The various features, advantages and other uses of the present invention will become more apparent by referring to the following detailed description and drawing in which.

DETALED DESCRIPTION

Figure 1:
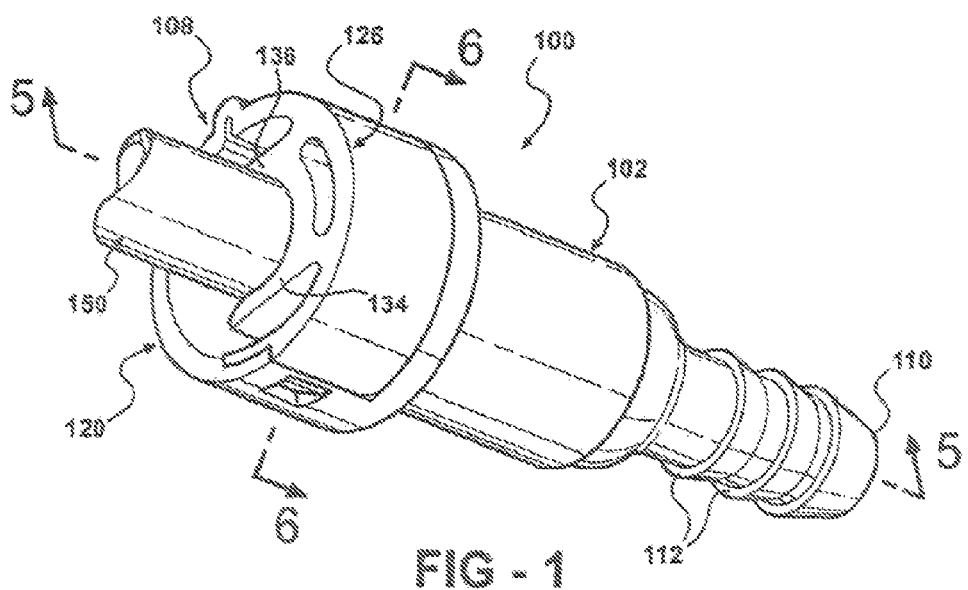
FIG. 1 is a perspective view of one aspect of a fluid quick connector shown in an endform latched position.

Referring now to FIGS. 1-6 of the drawing, there is depicted a fluid quick connector 100. The fluid quick connector 100 is adapted for sealingly and lockingly, yet removably engaging a first fluid carrying or operative member, such as a conduit, in a fluid tight, leak proof, sealed connection by a snap together arrangement.

Figure 4:
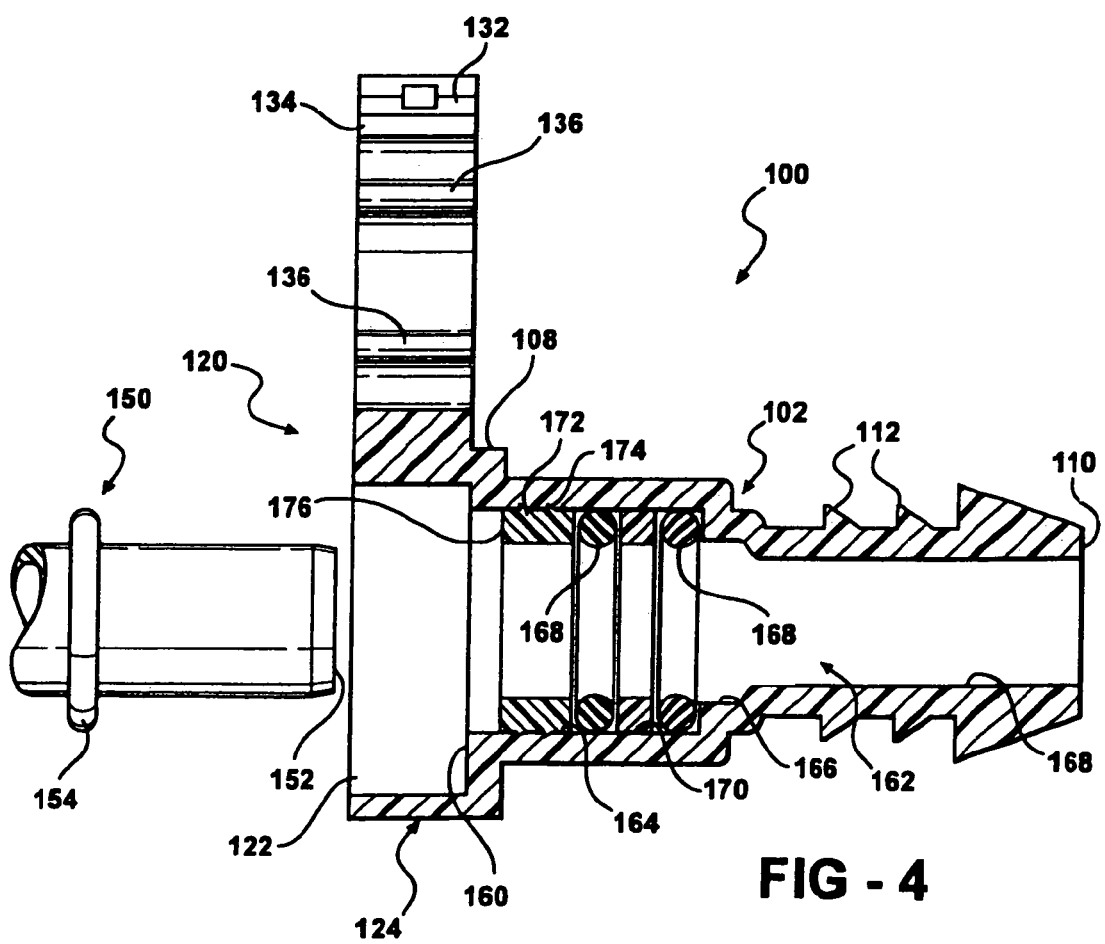
FIG. 4 is an exploded, cross sectional view generally taken along line 4-4 in FIG. 2.

The quick connector includes a housing 102. The housing 102 can be formed as an integral extension of a fluid operative device, such as a manifold, valve, etc., or as shown in FIGS. 1 and 4 as a one piece body, made of a high strength plastic, having a stepped exterior surface housing extending from an enlarged diameter flange 108 at one end to an opposed second end 110. The second end 110 may take various shapes, such as having an opening allowing fluid flow through an interior bore in the housing 102 from the flange 108 to the second end 110. Alternatively, the second end 110 may be closed terminating fluid flow in the housing 102.

The second end 110 may be axial with the flange 108 or at an angle, such as 90°, 45°, etc. from a longitudinal axis through the housing 102. In the case of fluid flow through the body 102, at least one or a plurality of longitudinally spaced barbs or projections 112 may be formed along the exterior of the housing 102 spaced from the second end 110 for secure engagement with a flexible conduit, such as a plastic or elastomer conduit, not shown, which is slidably urged thereover into sealed connection with the barbs 112.

The quick connector 100 also includes a retainer 120 which is integrally mounted as a one-piece, unitary part of the housing 102. This reduces the number of separate components which need to be separate manufactured and separately assembled in the quick connector housing 102 by eliminating a separate retainer as in a previously devised fluid quick connector using axial or transverse mounted retainers.

The retainer 120 includes an annular collar 122 which extends axially from the flange 108 and has a generally annular extent about the periphery of the flange 108. The collar 122 extends arcuately from a first end 124 to an opposed second end 126 generally over about 180° of the circumference of the flange 108.

The retainer 120 also includes a pivotal latch 126 which is also integrally molded as a unitary one-piece part of the retainer 120 and the housing 102. The latch 126 includes a generally annular endwall 128 which will have approximately the same diameter as the outer surface of the flange 108 of the housing 102. The end wall 128 extends annularly from a first end 130 to an opposed second end 132. A pair of inner disposed arms 134 and 136 defining a generally U-shaped opening interiorly therebetween extend from the endwall 128 and are movably spaced inward of the first and second ends 130 and 132 of the latch 126. The inner disposed arms 134 and 136 generally defining a plane.

The latch 126 is pivotally or hingedly connected to the collar 122 by a hinge 140, such as a living hinge formed of a thin flange extending between the second end 126 of the collar 122 and the first end 130 of the latch 126. The latch 126 is configured for movement in a bending direction B about an axis 137 between a first open position shown in FIG. 2 and a second fully closed position shown in FIG. 1 through an infinite number of intermediate positions, one of which is shown by example in FIG. 3.

Figure 2:
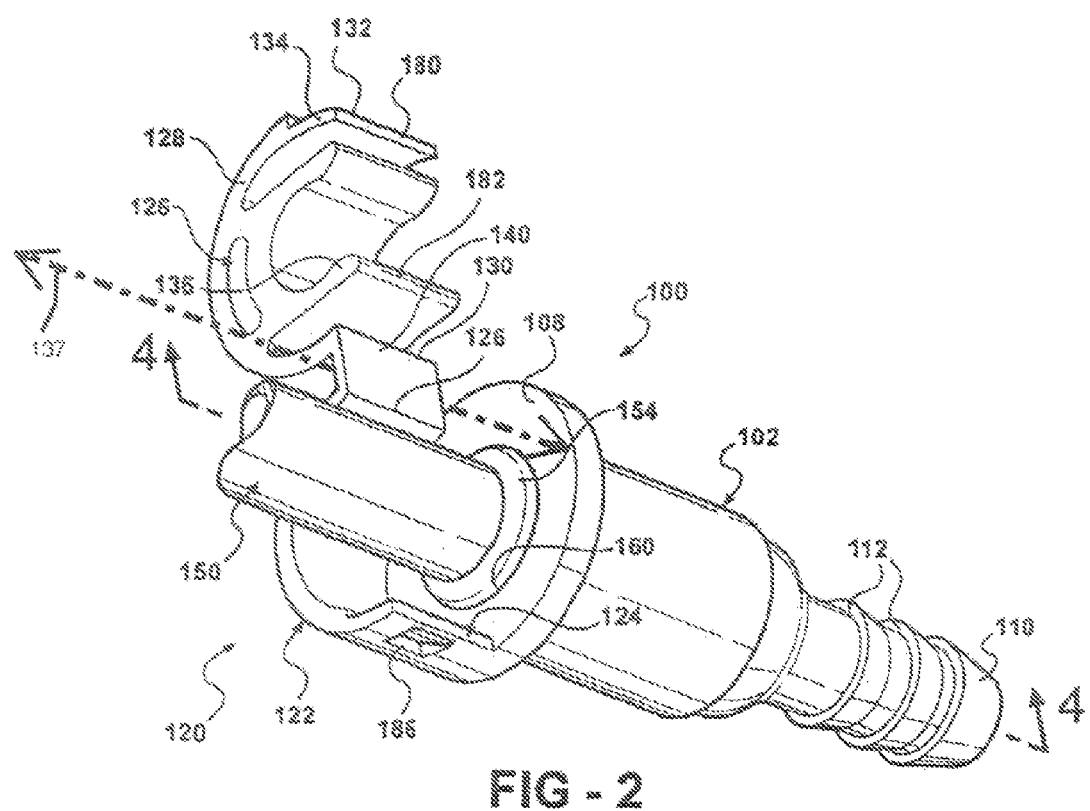
FIG. 2 is a perspective view of the fluid quick connector shown in FIG. 1, but with the retainer in an open position and the endform inserted into the quick connector housing.

In the open position shown in FIG. 2, the latch 126 is spaced from the collar 122 allowing easy insertion and removal of an endform 150, such as the end of a tubular conduit or a tubular extension on a fluid operative device, such as a fuel filter, fuel pump, etc., into and out of an internal bore in the housing 102, as shown more clearly in FIG. 4. By way of example only, the endform 150, in this aspect, includes a tip end 152 and a surface engagement feature 154 which, by example, is an enlarged diameter bead or flange formed in the endform 150 and spaced from the tip end 152.

Figure 5:
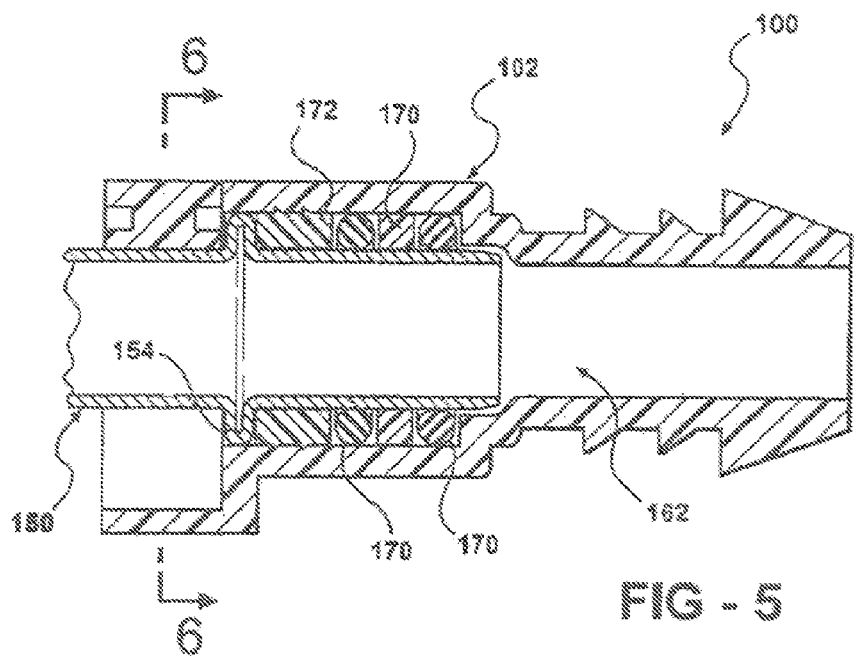
FIG. 5 is a cross-sectional view generally take along line 5-5 in FIG. 1.
Figure 6:
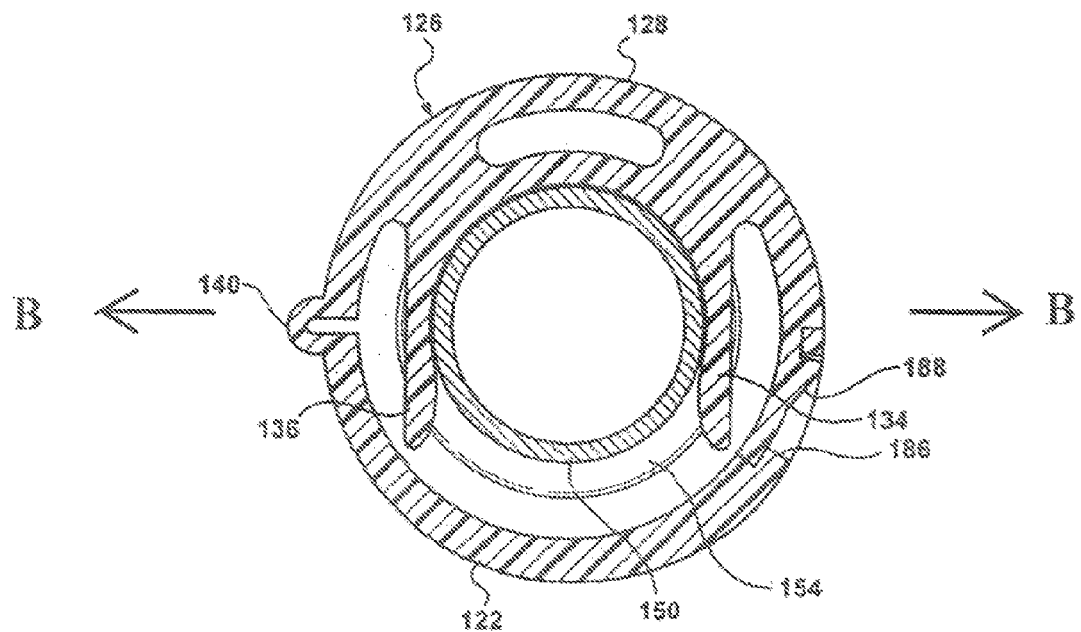
FIG. 6 is a cross-sectional view generally taken along line 6-6 in FIG. 1.

As shown in FIGS. 4 and 5, the housing 102 has an internal bore extending from a first end 160 at the flange 108. The bore denoted generally by reference number 162 includes a large diameter portion 164 extending from the first end 160, and an intermediate section 166 of smaller diameter, which transitions into a third yet smaller diameter bore portion 168.

Seal elements are mounted in the first bore portion 164 to provide sealing engagement between the endform 150 and the interior surface of the housing 102 surrounding the bore 162. By way of example only, the seal elements include a pair of axially-spaced, resilient seal members, such as O-rings 168 which are separated by a rigid spacer element 170. Generally cylindrical, a sleeve-like top hat 172 is mounted in the end of the first bore portion 164 to retain the seal elements 168 and 170 in the bore 162 prior to and after the endform 150 is inserted into or removed from the bore 102.

The top hat 172 can be press fit into the first bore portion 164 or fixedly mounted in the first bore portion 164 by a projection 174 which engages a correspondingly-formed recess in the inner surface of the first bore portion 164.

An axially end 176 of the top hat 172 is spaced from the first end 160 of the bore 162 to form an annular space within the flange 108 for receiving the surface engagement profile 154 or the endform 150 when the endform 150 is fully inserted into the bore 162 as shown in FIG. 5.

Figure 3:
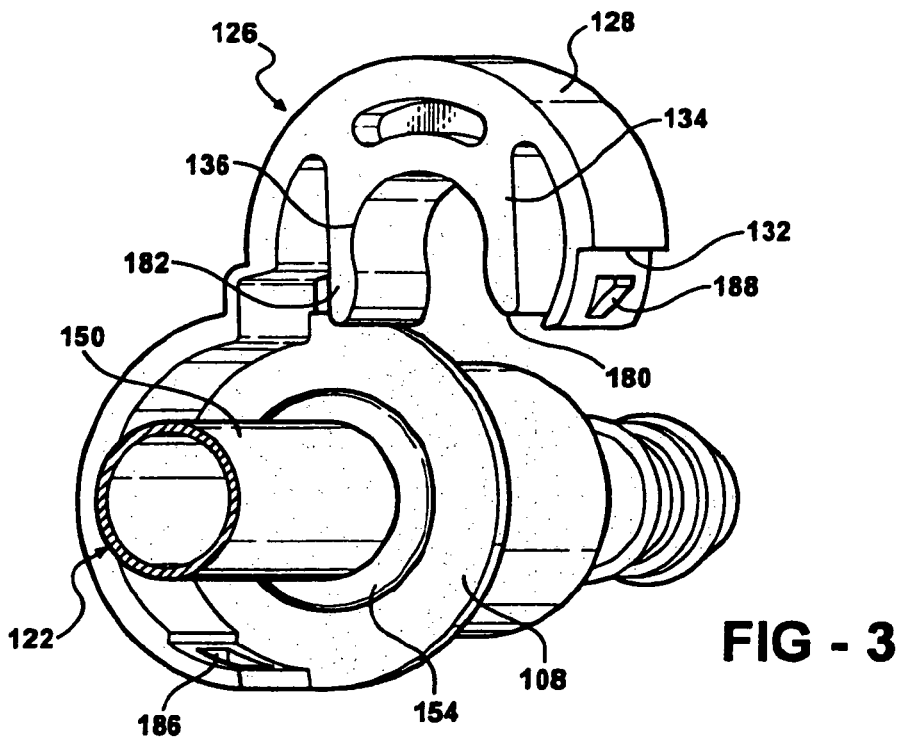
FIG. 3 is a perspective view of the quick connector shown in FIGS. 1 and 2, with the retainer depicted in an intermediate position between the fully opened and the fully latched positions of FIGS. 1 and 2.

After the endform 150 is filly inserted into the bore 162 in the housing 102 of the fluid quick connector 100, as shown in FIG. 5, where the end portion of the endform 150 is sealingly engaged with the seal elements 168 and 170 and is supported by the top hat 172 which acts as a bearing surface for the end of the endform 150, the latch 126 of the retainer 120 may be pivoted from the first open position shown in FIG. 2 through any number of intermediate positions, such as one intermediate position shown in FIG. 3, to the fully latched, closed position shown in FIGS. 1 and 5. During such movement, the outer ends 180 and 182 of the latch arms 134 and 136, respectively, which have a slight taper or ramp surface formed thereon, first engage the outer surface of the endform 150 adjacent to the surface engagement feature 154. Further, pivotal force on the latch 126 causes the ramp ends 180 and 182 of the arms 134 and 136 to slide about the exterior diameter of the endform 150 and then bend laterally outward in a direction B (Fig. 6) until the generally circular inner diameter formed between the arms 134 and 136 engages the complimentary diameter of the exterior surface of the endform 150. The ends 180 and 182 of the arms 134 and 136 will extend away from the surface of the endform 150. One side surface of the arms 134 and 136 and the endwall 128 will abut the surface engagement feature 154 on the endform 150, as shown in FIG. 5, to forcibly retain the endform 150 in the housing 102.

To secure the latch 126 to the collar 122, lock elements are formed on the first end 124 of the collar 122 and the second end 132 of the latch 126. Any easily engagable lock elements which move into a locking position during pivotal movement of the latch 126 to the fully closed position can be employed in the quick connector 100. By way of example only, the lock elements include an aperture 186 formed in the first end 124 of the collar 122 and a complimentary shaped projection 188 carried on the exterior surface of the second end 132 of the latch 126. As shown in FIGS. 1-3, the first end 124 of the collar 122 and the second end 132 of the latch 126 have oppositely directed offset ends of thinner thickness than the remainder of the collar 122 which inter-engage when the latch 126 is in the fully closed position and the projection 188 is locked within the aperture 182.

The latch 126 may be moved from the second closed position back to the fully open, first position by disengaging the projection 188 from the aperture 186. This may be accomplished by a tool which is inserted through the aperture 186 to bend the first end 124 of the collar 122 over the projection 188. The tool, if small enough in thickness, could be inserted between the overlaid ends 124 and 132 of the retainer 120 to separate the projection 188 from the aperture 186.

Figure 7:
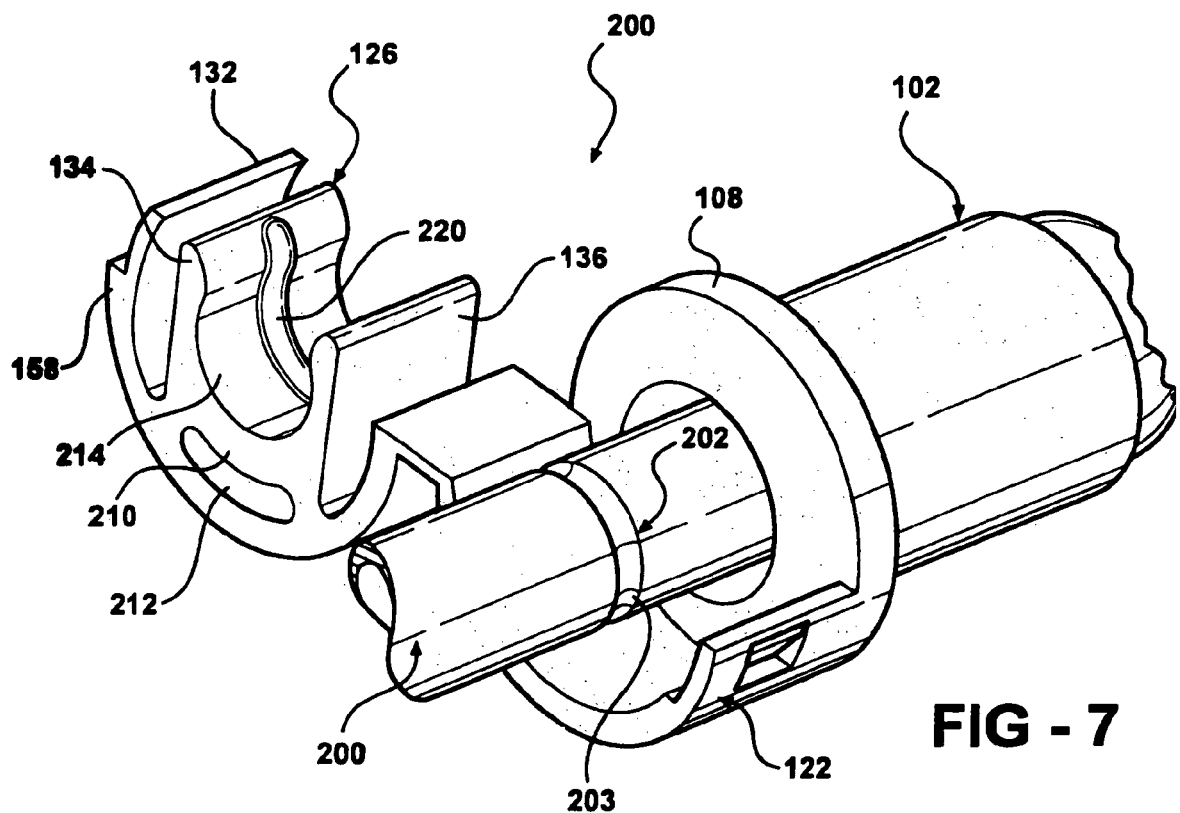
FIG. 7 is a perspective view of another aspect of the fluid quick connector shown with the endform mounted in the quick connector housing and the retainer in the fully opened position.
Figure 8:
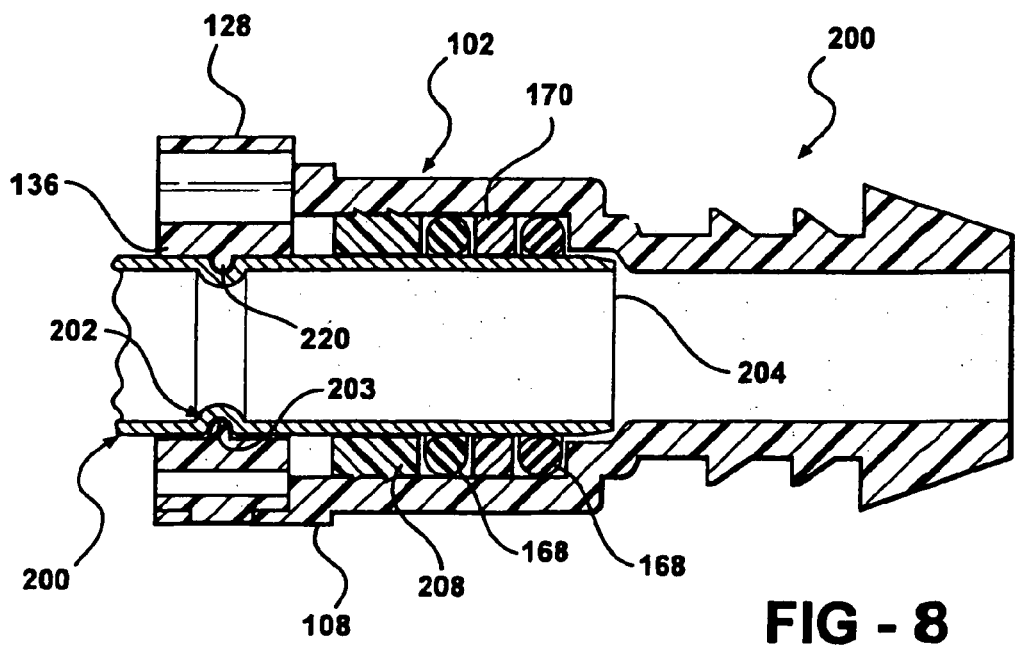
FIG. 8 a longitudinal cross-sectional view of the fluid quick connector shown in FIG. 7, but with a retainer depicted in its fully latched position about the endform.

Referring now to FIGS. 7 and 8, there is depicted another aspect of a fluid quick connector 200 which can be sealingly coupled to a fluid carrying or operative component. The connector 200 is substantially identical to connector 100 except that it is modified to sealingly and latchingly receive, an endform 200 having a surface engagement feature 202 which is different than the surface engagement feature 154 on the endform 150 shown in FIGS. 1-6 and described above.

The connector 200 includes the housing 102 and the latch 120. The locking connection of the pivotally-movable latch 120 with the collar 122 of the housing 102 is the same as that described above and shown in FIGS. 1-6.

As shown in FIGS. 7 and 8, the endform 200 generally is a tubular member having a surface engagement feature 202 located at a position on a tip end portion 204 spaced from a tip end 190. The surface engagement feature 202, by example only, is an annular recess or groove 203 formed in the endform 200. The annular recess or groove 203 has a smaller inner diameter than the outer diameter of the tip end portion 204 of the endform 200.

The housing 102 also includes the seal elements 168 and 170 and a top hat 208 which is press fit or locked in the bore of the housing 102. One end of the top hat 208 is substantially contiguous with the outer end of the flange 108 of the housing 102.

The retainer 120 is substantially identical to the retainer 126 shown in FIGS. 1-6. The retainer 126 includes the pair of inner arms 134 and 136. The arms 134 and 136 are interconnected by an end wall 210 which is joined to a necked section web 212 to the end wall 128. An inner surface 214 formed by the arms 134 and 136 and the end wall 210 has a generally circular shape. The diameter of the inner surface 214 between opposed portions of the arms 134 and 136 is the same or slightly larger than the outer diameter of the endform 200.

The spacing between the laterally outside edges of the arms 134 and 135 is greater than the outer diameter of the tip end portion 204 of the endform 200. In this manner, if the retainer 126 is inadvertently moved from the first open position shown in FIG. 9 to the fully latched position shown in FIG. 8 prior to insertion of the endform 200 into the housing 102, the inner arms 134 and 138 will block insertion of the tip end 204 of the end form 200 past the retainer 126 into the housing 210. Only when the retainer 126 is in the first open position shown in FIG. 8 can the tip end 204 of the endform 200 be fully inserted into the bore in this housing 102 until the tip end 204 engages the seal elements 168, 170 and 208.

The retainer 126 is provided with a surface engagement member 220 in the form at least one of radially inward projection formed on the inner surface 214 of the endwall 210 and the contiguous inner surfaces of the arms 134 and 136. The surface engagement member 220 is complimentary in shape to the surface engagement feature 202 which, in this aspect, is in the form of a radially inward extending recess or groove in the endform 200.

When the retainer 126 is moved from the first position shown in FIG. 7 to the latched position shown in FIG. 8, the surface engagement member 220 securely engages the recess 203 in the endform 200 to fixedly latch the endform 200 in the housing 102.

Figure 9:
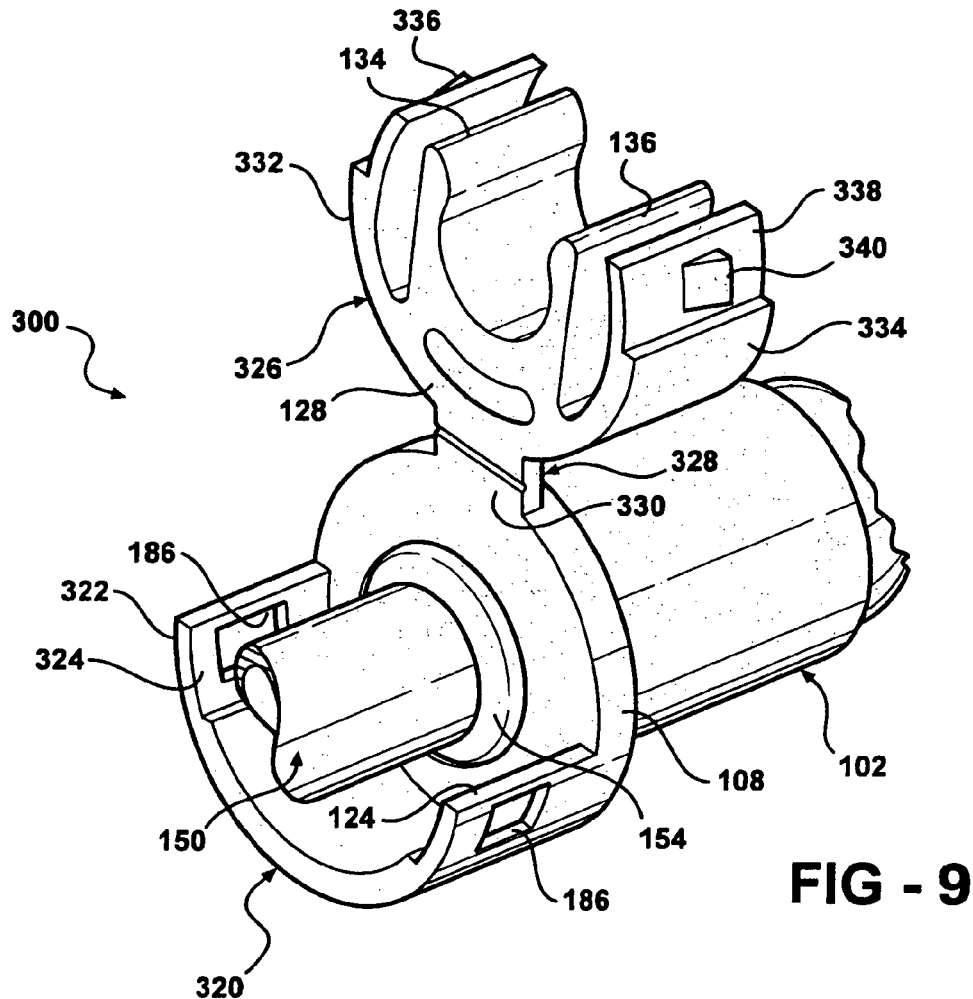
FIG. 9 is a perspective view of another aspect of a fluid quick connector depicted with the retainer in a fully opened position.
Figure 10:
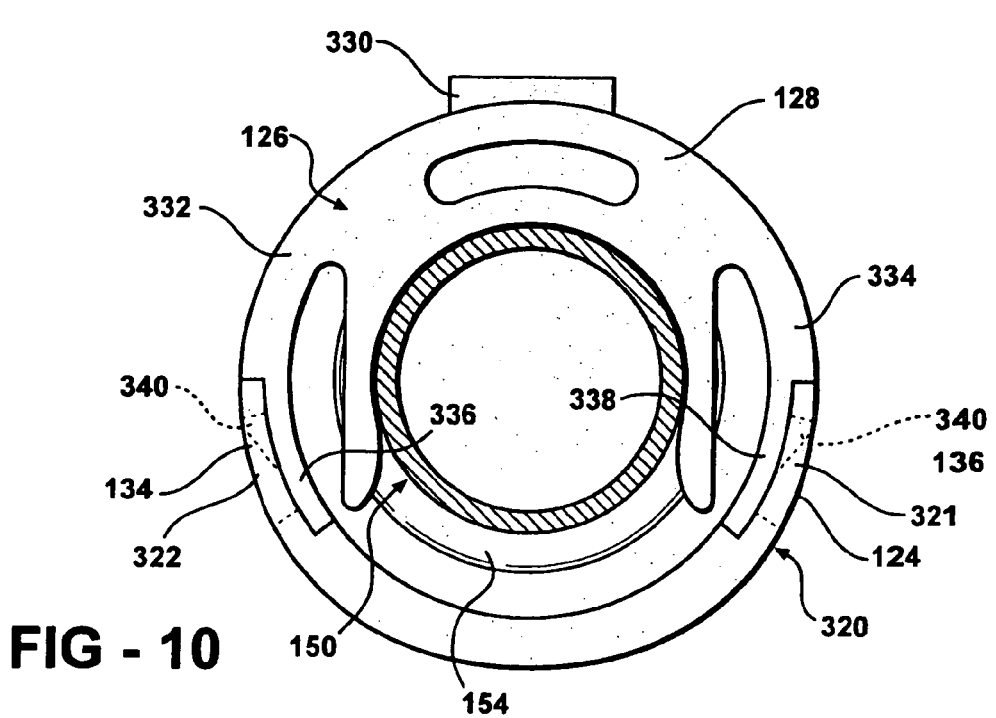
FIG. 10 is a left-end view of the fluid quick connector shown in FIG. 9, with the retainer in the fully latched position about the endform mounted in the quick connector housing.

Referring now to FIGS. 9 and 10, there is depicted another aspect of a fluid quick connector 300 which is fluidically coupled to a fluid operative or fluid carrying components, one of which has an endform 150. It will be understood that the endform 150 can be replaced by the endform 200 with a suitable modification to the retainer of the quick connector 300 by using the retainer 126 with the radially inward extending projection 220 shown in FIG. 7.

The quick connector 300 has some of the same features and components as the connector 100. The common components are designated by the same reference number for clarity. Thus, the quick connector 300 includes the housing 102 which has the internal bore 162, and seal elements 168, 170 and 172 mounted therein for sealingly coupling the tip end of the end form 150 in the housing 102.

A collar 320 extends integrally and axially from the flange 108 at one end of the housing 102. The collar 320 is substantially identical to the collar 120 in that it includes a first end 124 having a necked-down thickness 321 and the lock aperture 186. The collar 320 has a generally semi-circular shape extending from the first end 124 to an opposed second end 322 which also has a necked-down end portion 324 and a lock aperture 186.

The connector 300 includes a retainer 326 which is pivotally or hingedly coupled to the housing 102. The retainer 326 is substantially identically to the retainer 126. The retainer 326 includes the inner arms 134 and 136 which are interconnected by the endwall 128. The endwall 128 is pivotally coupled to the housing 102 by a living hinge 328 formed of a thin flange 330 integrally formed and extending radially outward from the flange 108 on the housing 102. This provides a clamshell-like pivotal movement of the retainer 326 from a first open position shown in FIG. 9 to a second closed position shown in FIG. 10 about a lateral axis extending through the flange 330 of the hinge 328 which is transverse to the longitudinal axis extending through the bore in the housing 102.

The outer legs 332 and 334 of the retainer 326 are spaced laterally outward of the inner arms 134 and 136, respectively. Each of the outer legs 332 and 334 has a reduced thickness end portion 336 and 338, respectively, which carries a complimentary lock member, such as a projection 340, for engagement with the lock apertures 186 on the collar 320 to releasably latch the retainer 326 to the collar 320 and to simultaneously latch the endform 150 in the housing 102 in the second latched position shown in FIG. 10.

What is claimed is:

1. A fluid quick connector for receiving an endform having an engagement surface, the quick connector comprising:

a housing having a bore extending from a first end adapted to receive the endform;

a retainer carrying an endform engagement member adapted to engage the engagement surface on the endform to latch the endform in the housing; the retainer pivotally connected to the housing for movement between a first position allowing movement of the endform relative to the housing and a second position engaged with the housing, the endform engagement member configured to extend radially past a longitudinal axis of the bore when the retainer is in the second position;

cooperating lock members on the retainer in the housing for locking the retainer in the second position; and a hinge coupling the retainer and the housing, the hinge being a living hinge forming the retainer and the housing as a one-piece unitary structure.

2. The quick connector of claim 1, further comprising: the cooperating lock members radially moveable relative the longitudinal axis to releasably lock the retainer to the housing in the second position.

3. The quick connector of claim 2, wherein the lock members comprise:

a projection formed on one of the housing and the retainer; and an aperture extending through the other of the housing and the retainer.

4. The quick connector of claim 1, wherein a pivot axis of retainer formed by the hinge is substantially parallel to the longitudinal axis of the housing and transverse to a bending direction of the endform engagement member when the retainer moves between the first position and the second position.

5. The quick connector of claim 1, wherein; a pivot axis for the retainer formed by the hinge is transverse to the longitudinal axis of the housing and transverse to a bending direction of the endform engagement member when the retainer moves between the first position and the second position.

* * * * *